C. W. SALADEE.
Compound Torsional Springs for Vehicles.
No. 134,006.  Patented Dec. 17, 1872.
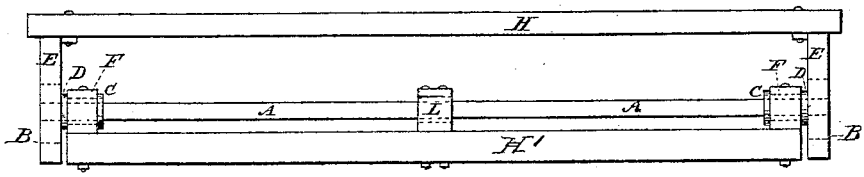
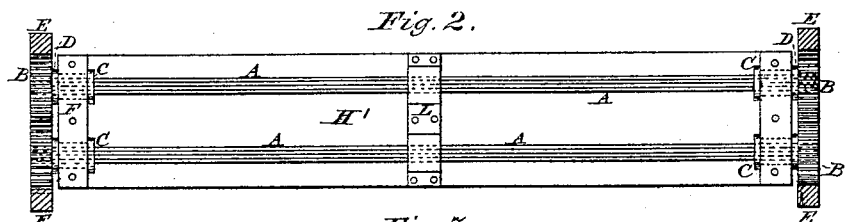
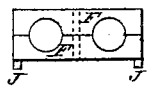 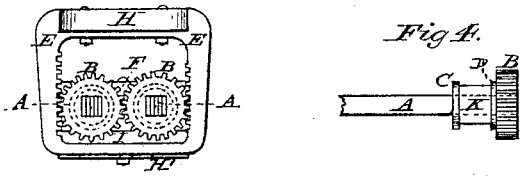
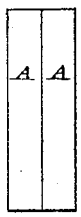 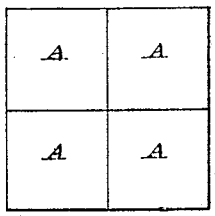 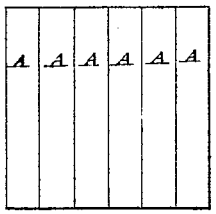  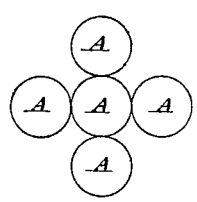
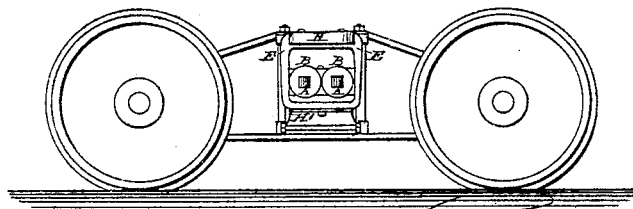
Witnesses:  Inventor:

UNITED STATES PATENT OFFICE.

CYRUS W. SALADEE, OF ST. CATHARINE'S, CANADA.

IMPROVEMENT IN COMPOUND TORSIONAL SPRINGS FOR VEHICLES.

Specification forming part of Letters Patent No. 134,006, dated December 17, 1872.

*To all whom it may concern:*

Be it known that I, CYRUS W. SALADEE, of St. Catharine's, in the Dominion of Canada, have invented certain Improvements in Compound Torsional Springs, of which the following is a specification embodying my invention:

Nature and Object.

The first part of my invention relates to the formation of a torsional spring, and which consists of a single plate of steel in place of the round or squared rod known and used for that purpose. The second part of my invention relates to the formation of torsional springs composed of two or more plates of steel, or of squared or round rods or wire, and placed together in such manner that they shall operate in unison each with the other; and has for its object, first, greater security against liability to break under heavy pressure; and, second, to secure greater elasticity to a given length and thickness than can be had from a solid rod or bar of steel. The third part of my invention relates to the manner of securing and operating the outer ends of torsional springs of all kinds by the employment of racks and pinions, as hereinafter clearly set forth.

Actual experiments have demonstrated that a single plate for springs, whether of the elliptical or torsional form, can be made to answer a very excellent purpose when employed for light vehicles; but when a heavy burden is to be sustained, as in railway cars and heavy road-wagons, and the springs are made of a single solid plate or bar of steel strong enough to carry the load, there would be no sufficient elasticity. This comes from the limit that is prescribed as to the length of all springs used on railway cars and other vehicles in their application thereto; and this is particularly true as to the application of torsional springs; and to obtain the requisite length, in proportion to the diameter or thickness of the solid rod or bar of steel employed to sustain heavy loads, has been a matter of perplexity on the part of inventors. If such were not the case, and we were not limited as to length of rod, a torsional spring of any required diameter or thickness could be produced with the desired elasticity as well as the required resistance. But since the lengths of the rods are limited, other means must be resorted to in order to compensate for what is lacking in that direction.

In the elliptical and half-elliptic form of springs this difficulty is met by the employment of a number of thin plates overlying each other, and which principle is carried to any extent required by the load to be imposed and carried; and, in like manner, I propose to make torsional springs composed of a number of thin plates or rods of steel placed together upon one and the same line of bearings, and in such manner that the plates or rods shall work together in their torsional action in unison—the same, in fact, as the plates overlying each other in elliptic springs; and I am thus enabled to disregard the length of spring and yet secure as soft and elastic a motion as the case may require under all circumstances. For light purposes a great advantage is had over the single rod of round or square steel by substituting therefor a single flat plate, as shown by an end view of same in Fig. 9 of the drawing.

In the drawing, Figure 1 represents a side or front elevation, showing the upper and lower bed-plates H and H', and with the springs A in position. Fig. 2 is a top view with the upper bed-plate H removed. Fig. 3 is an end view of Figs. 1 and 2. Fig. 4 is a detached view of the sleeve-bearing K, with pinion B attached thereto, and a piece of the spring A passing through. Fig. 5 is a detached view of the split box F, in which the sleeve-bearings K have their place. Fig. 6 is an enlarged view of the end of the spring A, showing the ends of the plates A in connection with each other. Fig. 7 is also an enlarged view, showing the ends of four square bars of steel placed together. Fig. 8 is an end view of but two plates, A, placed together. Fig. 9 is an end view of a single plate, A. Fig. 10 is an end view of five round rods of steel placed together and forming the complete spring, and Fig. 11 is a side view of a railway truck, showing my invention in working position.

I construct the compound spring in either of the following ways, viz: First, a number of thin plates, A, of requisite length—be the same two or more—are placed side by side, in close contact or slightly separated, as the case may require, as seen in Figs. 1, 2, 3, 6, and 8. The central portions of these combined plates are firmly and rigidly held in the bearing I, Figs. 1 and 2, and the outer ends are passed through the sleeve-bearings K C D, which latter are supported in the split box F. On the outer ends of the sleeve-bearings K (see Fig. 4) are formed or attached the cog-pinions B, of the requisite diameter to mesh into each other, as seen in Figs. 2 and 3. On the opposite sides of these two pinions is connected the double rack E E, (see Fig. 3,) the top of which is firmly secured to the bed-plate H, on the top of which latter the body of the car is secured in position.

It will now be readily understood that as weight is placed upon the bed-plate H the tendency is to rotate the pinions B B by the racks E E in opposite directions from their point of contact, and thus actuate the springs A; second, as another modification for the construction of a compound spring, four or more square rods may be placed together, as seen in the end view, Fig. 7, in place of the flat plates seen in Fig. 6; third, again still another modification is the combining together of a number of round rods, as seen in Fig. 10, supported and operated substantially as in the first modification described; and, fourth, for light purposes I shall use but a single flat plate, A, as seen in Fig. 9, and the same is secured in position and operated either by the pinions B and racks E or by simple arms attached to its outer ends.

Claims.

I claim as my invention—

1. A torsional spring composed of a single flat plate of steel, as and for the purpose set forth.

2. A torsional spring composed of two or more plates of steel, the same being united and working together in unison each with the other, as and for the purpose set forth.

3. A torsional spring composed of two or more round or square rods of steel, the same being united and working together in unison each with the other, as and for the purpose set forth.

4. In combination with torsional springs, the pinions B B and rack E E, substantially as and for the purpose set forth.

CYRUS W. SALADEE.

Witnesses:
   EDM. F. BROWN,
   C. BESTOR.